United States Patent [19]
Lindstrom et al.

[11] Patent Number: 6,035,971
[45] Date of Patent: *Mar. 14, 2000

[54] CHECK OUT STAND WITH TELESCOPING TAKE-AWAY CONVEYOR

[75] Inventors: Charles W. Lindstrom, Lynnwood; Erland F. Russell, Redmond; Bradley D. Bradshaw; Paul D. Thompson, both of Everett, all of Wash.

[73] Assignee: Reynolds Corporation, Lynnwood, Wash.

[ * ] Notice: This patent is subject to a terminal disclaimer.

[21] Appl. No.: 09/082,985

[22] Filed: May 21, 1998

Related U.S. Application Data

[63] Continuation of application No. 08/726,646, Oct. 7, 1996, Pat. No. 5,755,308.

[51] Int. Cl.$^7$ ...................................................... A47F 9/04
[52] U.S. Cl. ................... 186/61; 186/66; 186/68; 198/812
[58] Field of Search ................... 186/61–69; 189/812

[56] References Cited

U.S. PATENT DOCUMENTS

| | | | |
|---|---|---|---|
| 3,127,978 | 4/1964 | Zuercher | 198/812 |
| 3,826,353 | 7/1974 | Greasley . | |
| 3,935,941 | 2/1976 | Keck . | |
| 4,061,205 | 12/1977 | Musser | 186/68 X |
| 4,182,433 | 1/1980 | Foster | 186/68 |
| 4,392,553 | 7/1983 | Foster | 186/61 |
| 5,074,402 | 12/1991 | Bender-Zinnoni et al. | 198/812 X |
| 5,423,413 | 6/1995 | Gilmore | 198/812 X |

OTHER PUBLICATIONS

The Reynolds Corporation: "The Data 4000 Dual Power Take Away System" (Information sheet); May 1, 1985.
The Reynolds Corporation: "The Data 3000 CD3RT2 Series Left Hand Take Away" (Information sheet): Apr. 1, 1987.
The Reynolds Corporation: "Data 3000 Series Left Hand Take Away With SLide Back Belt" CD3RT5 (Information sheet); May 18, 1988.

*Primary Examiner*—F. J. Bartuska
*Attorney, Agent, or Firm*—Michalik & Wylie, PLLC

[57] ABSTRACT

A check out stand (20) having a telescoping take-away conveyor (26) extending between a front module (22) and a rear module (24). Retraction of the telescoping take-away conveyor (26) allows an area located beneath the leading end of the conveyor to be exposed. The exposed area can support a single bag (85) for bagging groceries and other items. If the telescoping take-away conveyor (26) is retracted only a limited amount, the single bag (85) may be inserted between the leading end of the telescoping take-away conveyor (26) and the trailing end of the scanner (32). The telescoping take-away conveyor (26) utilizes a friction roller (66) that permits the powered roller (60) for the telescoping take-away conveyor (26).

15 Claims, 6 Drawing Sheets

CHECK OUT STAND WITH TELESCOPING TAKE-AWAY CONVEYOR

REFERENCE TO RELATED APPLICATION

This application is a continuation application of Ser. No. 08/726,646, filed on Oct. 7, 1996, now U.S. Pat. No. 5,755,308 incorporated herein by reference.

FIELD OF THE INVENTION

This invention relates to check out stands, and, more specifically, to store check out stands.

BACKGROUND OF THE INVENTION

A check out stand is a station at which a customer in a store, such as a grocery store, unloads the items he or she intends to purchase, i.e., groceries, a register clerk scans or enters the prices of the items, the customer pays for the items, and a clerk bags, in some cases, the items and places the bags in a cart. A number of check out stands are usually lined along the exit of the store so that multiple customers can assemble their items and purchase them on the way out of the store.

One design of a check out stand includes a front module upon which the customer unloads groceries or other items. A scanner and register are located at the trailing end of the front module. The front module usually includes a conveyor, called an "accumulation conveyor," for conveying the groceries toward the scanner and the cash register. A register clerk lifts each of the items from the accumulation conveyor and either scans the item across the scanner, or manually enters the price and stock number information in the cash register. The scanned items are placed on a second conveyor, called a "take-away conveyor," that extends to a rear module. The take-away conveyor deposits the scanned items at the trailing end of the rear module, where a bagging clerk places each of the scanned items into bags.

In normal operation of a check out stand, such as is described above, the leading edge of the take-away conveyor extends from the trailing edge of the scanner such that a constant surface is formed between the accumulation conveyor, the scanner, and the take-away conveyor. This arrangement is convenient for the register clerk, allowing him or her to quickly scan and pass a large amount of items. For ease of description, the configuration and operation in which the take-away conveyor extends from the trailing edge of the scanner will be called "scan-and-pass."

A large number of grocery stores are reducing their work force by eliminating the need for a separate bagging clerk during slower periods of business or at check out stands where a limited number of items are purchased. When a separate bagging clerk is not used, the register clerk both scans and bags the groceries. For maximal efficiency, it is desirable for the register clerk to bag the groceries as they are scanned. To provide this service, some prior art check out stands include a take-away conveyor having a leading end which is movable away from the trailing end of the scanner. Withdrawal of the take-away conveyor exposes an area located beneath the leading end of the conveyor. The exposed area includes a support shelf for use in bagging groceries and other items. If the take-away conveyor is partially withdrawn, a single bag can be inserted between the leading end of the take-away conveyor and the trailing end of the scanner. In this arrangement, the register clerk may reach over the single bag and place items on the take-away conveyor, or bag items in the single bag. For ease of description, the configuration and operation in which the take-away conveyor is in this intermediate position will be called "scan-and-bag."

The take-away conveyor is designed to be further retracted to provide access to a pass-through via which the register clerk may access the customer's cart to load filled bags. For ease of description, the configuration and operation in which the take-away conveyor is completely retracted so that the register clerk may pass will be called "walk-through."

The prior art provides at least two ways of withdrawing the take-away conveyor from the trailing edge of the scanner. In a first check out stand design, the take-away conveyor is mounted so it can slide into a recess in the rear module. The register clerk pulls the take-away conveyor forward to the scanner to perform scan-and-pass operation, and pushes the take-away conveyor backward into the recess to perform the scan-and-bag or the walk-through operations.

There are a number of problems with a manually-operated retractable, take-away conveyor. First, the manually-operated retractable conveyor is often heavy and difficult to move in or out of the rear module. Thus, the register clerk may not take advantage of the reconfigurable aspects of the check out stand. In addition, in the scan-and-pass position, the trailing end of the take-away conveyor is removed from the trailing end of the rear module, leaving a large portion of the rear module recess exposed. Typically, a cover plate extends over a portion of the recess to minimize the exposed area. Items moving along the take-away conveyor when it is in the scan-and-pass position are deposited onto the leading edge of the cover plate. This leading edge is removed from the back end of the rear module by a length that is at least as long as the slide of the take-away conveyor. To reach the groceries or other items conveyed by the take-away conveyor, a bagging clerk must extend out over the cover plate. Constant reaching and extension by the bagging clerk is inconvenient, and may be uncomfortable for the bagging clerk. Another downside of the manually-operated retractable take-away conveyors is that the conveyor recess, and therefore the conveyor length, is limited by the length of the rear module recess.

Another check out stand design utilizes a fold-down take-away conveyor that extends between the rear module and the scanner. An example of such a check out stand is shown in U.S. Pat. No. 4,182,433 to Foster. In scan-and-pass operation, the fold-down conveyor extends horizontally from the trailing edge of the scanner to the leading edge of the rear module. A second take-away conveyor extends along the top surface of the rear module and abuts the trailing edge of the fold-down conveyor. After being scanned, items are placed on the fold-down conveyor, and are conveyed along the fold-down conveyor to the second take-away conveyor. The groceries then move along the second take-away conveyor toward the trailing end of the rear module. If the register clerk wishes to perform a scan-and-bag or walk-through operation, the leading end (closest to the scanner) of the fold-down conveyor is released, and the conveyor is rotated downward about the trailing end (closest to the rear module) of the conveyor so that the fold-down conveyor extends perpendicularly to the floor. A single bag is then inserted adjacent to the trailing end of the scanner, and the register clerk is provided a station which permits convenient scanning and bagging of groceries. When the single bag is removed from the second take-away conveyor, a walk-through space is provided. Because the fold-down conveyor has only two configurations, the scan-and-bag configuration described above cannot be easily provided. In addition, manipulation of the fold-down conveyor and bagging stand are difficult and time consuming. This hindrance may cause a register clerk not to use the different configurations provided by the check out stand.

Thus, there is a need for a check out stand which is easily configurable to allow scan-and-pass, scan-and-bag, and walk-through operations.

SUMMARY OF THE INVENTION

In accordance with the present invention, a telescoping take-away conveyor for a check out stand is provided. The telescoping take-away conveyor is automatically reconfigurable between the scan-and-pass, walk-through, and scan-and-bag positions described above. More particularly, the check out stand has a front module, a rear module, and a telescoping take-away conveyor attached to one of the front and rear modules. The telescoping take-away conveyor is capable of expending and lengthening to extend forward and away from the other front and rear modules. The expansion and lengthening permits the telescoping take-away conveyor to extend from a first position in which the telescoping take-away conveyor does not extend to other front and rear modules and a second position in which the telescoping take-away conveyor extends between the rear module and the front module. The check out stand may include a scanner located at the end of front module closest to the rear module.

In accordance with other aspects of this invention, the telescoping conveyor includes a conveyor base mounted to the rear module and a slide tray slidably mounted along the conveyor base. A first force is required to slide the slide tray along the conveyor base. The telescoping conveyor also has a powered roller mounted transverse to one of the conveyor base and the slide tray and a friction roller mounted parallel to the powered roller and on the other of the conveyor base and the slide tray. A second force is required to rotate the friction roller. A continuous belt is wrapped in tension around the powered roller and the friction roller in such a manner that the continuous belt maintains its tension about the powered roller and the friction roller as the slide tray slides relative to the conveyor base. The relation of the first and second forces is such that rotation of the powered roller causes rotation of the continuous belt about the powered roller which, unless an outside force acts on the slide tray, causes retraction and extension of the slide tray relative to the conveyor base, thereby causing the telescoping take-away conveyor to expand between the first and second positions.

In accordance with further aspects of this invention, the friction roller preferably includes an axle, a bearing around the axle, and a roller surface around the bearing. A repositionable bushing is provided for applying pressure to the bearing, the pressure impeding rotation of the roller surface about the axle.

In accordance with yet other aspects of this invention, a first mechanical stop that limits extension of the slide tray relative to the conveyor base is provided. Preferably, the first mechanical stop precludes extension of the slide tray once the telescoping conveyor has reached the front module.

In accordance with still further aspects of this invention, a linkage that is selectively attachable between the front module and the telescoping conveyor is provided. If the scanner is located at the end of front module closest to the rear module, the linkage preferably is a transition plate hinged from the end of the scanner located closest to the telescoping conveyor. To attach the transition plate to the telescoping conveyor, the end of the telescoping conveyor closest to the front module includes a slot, and the transition plate has a flange that extends into the slot.

In accordance with yet further aspects of this invention, a second mechanical stop permits extension of the of the telescoping conveyor from the first position to second position and selectively stops retraction of the telescoping conveyor between the first and second positions at a third position. Preferably, the second mechanical stop includes a solenoid mounted on a first of the conveyor base and the slide tray, the solenoid comprising a stop bracket that is selectively operable between an "in" position in which the retraction of the telescoping conveyor between the first and second positions is not stopped, and an "out" position in which retraction of the telescoping conveyor between the first and second positions is stopped at the third position. A rotatable cam may be provided that rolls over the stop bracket when the stop bracket is in the out position and the telescoping take-away conveyor is extending. The rotatable cam engages the stop bracket when the stop bracket is in the out position and the telescoping take-away conveyor is retracting. The engagement of the rotating cam with the stop bracket causes the telescoping take-away conveyor to stop at the third position.

In summary, the present invention provides a check out stand having a front module, a rear module, and a take-away conveyor received within the rear module. The take-away conveyor is extendible from a first position in which the telescoping take-away conveyor does not extend to the first module and a second position in which the telescoping take-away conveyor extends between the rear module and the front module. A mechanism is provided that automatically extends the conveyor from the first position to the second position. Preferably, the conveyor includes a continuous belt, at least a part of which forms a conveying surface for the conveyor, and a powered roller. The powered roller is operable to rotate the continuous belt, and the operation of the powered roller serves to automatically extend the conveyor from the first position to the second position.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
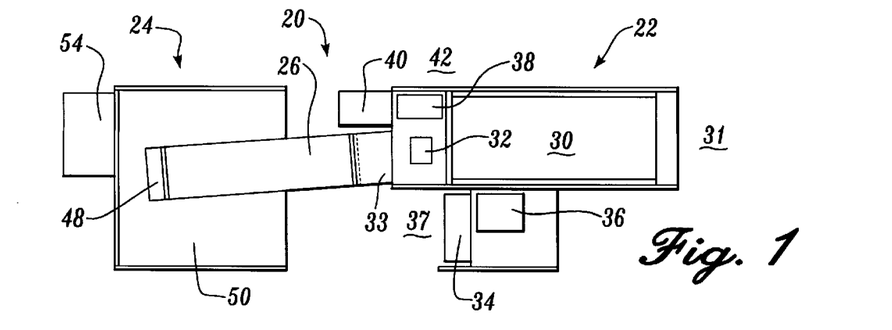
FIG. 1 is a top view of a check out stand incorporating the telescoping take-away conveyor of the present invention, with the telescoping take-away conveyor shown in a scan-and-pass position.

Referring now to the drawings, in which like numerals represent like parts throughout the several views, FIG. 1 shows a check out stand 20 incorporating the present invention. The check out stand 20 includes a front module 22 and a rear module 24. A telescoping take-away conveyor 26 extends from the front module 22 to the rear module 24. Briefly described, the check out stand 20 is arranged so that a customer places groceries or other items on the front module 22 and the items are conveyed to the register clerk for scanning. The scanned items are then placed on the telescoping take-away conveyor 26. The telescoping take-away conveyor 26 deposits the scanned items at the trailing end of the rear module, where a bagging clerk places each of the scanned items into bags. The check out stand 20 thus offers scan-and-pass operation. As described in detail below, the telescoping take-away conveyor 26 is designed such that it is retractable from the positions shown in FIG. 1 to the positions shown in FIGS. 2A, 2B, and 3. In these positions, the check out stand allows scan-and-bag and walk-through operations, respectively.

For ease of description, the right side of FIG. 1 will be referred to as the "leading," or front end of the check out stand 20, and the left side of FIG. 1 will be referred to as the "trailing," or rear, end of the check out stand. The side of the check out stand 20 at the bottom of FIG. 1 will be referred to as the "register clerk" side, and the side at the top of FIG. 1 is the "customer" side of the check out stand 20.

The front module 22 includes an accumulation conveyor 30. At the leading end of the accumulation conveyor 30 is a load area 31. A scanner 32 is located at the trailing end of the accumulation conveyor 30. A transition plate 33 is hinged from the top, trailing edge of the scanner and extends rearward from the scanner. The transition plate 33 extends to the leading edge of the telescoping take-away conveyor 26 when the telescoping take-away conveyor is in the scan-and-pass position shown in FIG. 1. Along the register clerk side of the accumulation conveyor 30, adjacent to the scanner 32, is a cash drawer 34 and a register 36. These items are arranged so that they can be easily accessed by a register clerk located in a register clerk station 37.

On the customer side of the accumulation conveyor 30, adjacent to the scanner 32, is a keyboard 38, as well as a check writing surface 40. The check writing surface 40 is arranged so that it may be easily accessed by a customer standing in a customer waiting area 42.

The rear module 24 includes an item deposit area 48 located at the trailing end of the telescoping take-away conveyor 26. The top surface 50 of the rear module 24 serves as a checked-item storage surface. A bagging station 54 is located at the rear end of the rear module 24 adjacent to the item deposit area 48.

Figure 12:
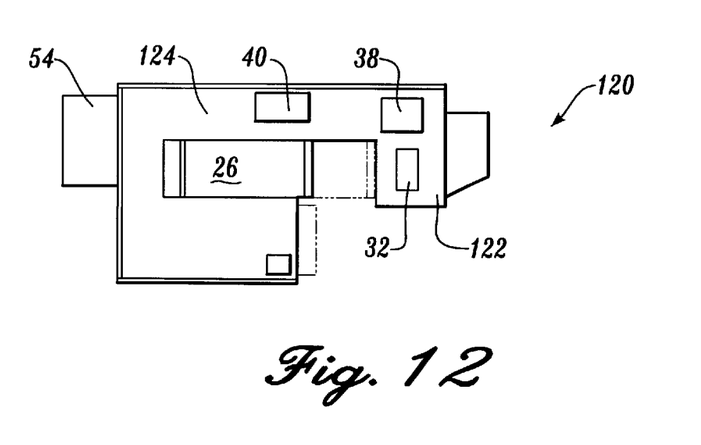
FIG. 12 is a top view of a second embodiment of a check out stand incorporating the present invention.

The operation and structure of the check out stand 20, with the exception of the telescoping take-away conveyor 26, are known in the art. A customer with a cart of items wheels the cart to the load area 31 and unloads the items onto the accumulation conveyor 30. The accumulation conveyor 30 moves the items toward the scanner 32. A register clerk standing in the register clerks station 37 lifts the items from the accumulation conveyor 30 and scans the items on the scanner 32. Alternatively, the price and stock number of the items may be manually entered by the register clerk on the keyboard 38. After scanning the items, the register clerk places the scanned items on the telescoping take-away conveyor 26. The items move along the telescoping take-away conveyor 26 to the item deposit area 48, where they are sorted along the top surface 50 of the rear module 24 by a baggage clerk, and bagged at the bagging station 54 by the bagging clerk. The configuration of the check out stand 20 shown in FIG. 1 can be modified in manners well known to persons skilled in this art. For example, the accumulating conveyor 30 may be replaced with a rotating conveyor. In addition, the front and rear modules 22, 24 may be connected so as to form a single unit. An example of such a check out stand 120 is set forth in FIG. 12. The check out stand 120 is the checker-unload variety and includes a front module 122 attached to a rear module 124. Although the connection of the front module 122 to the rear module 124 prevents walk-through operation of the check out stand 120, the telescoping take-away conveyor 26 is still capable of lengthening toward and away from the front module.

Figure 4:
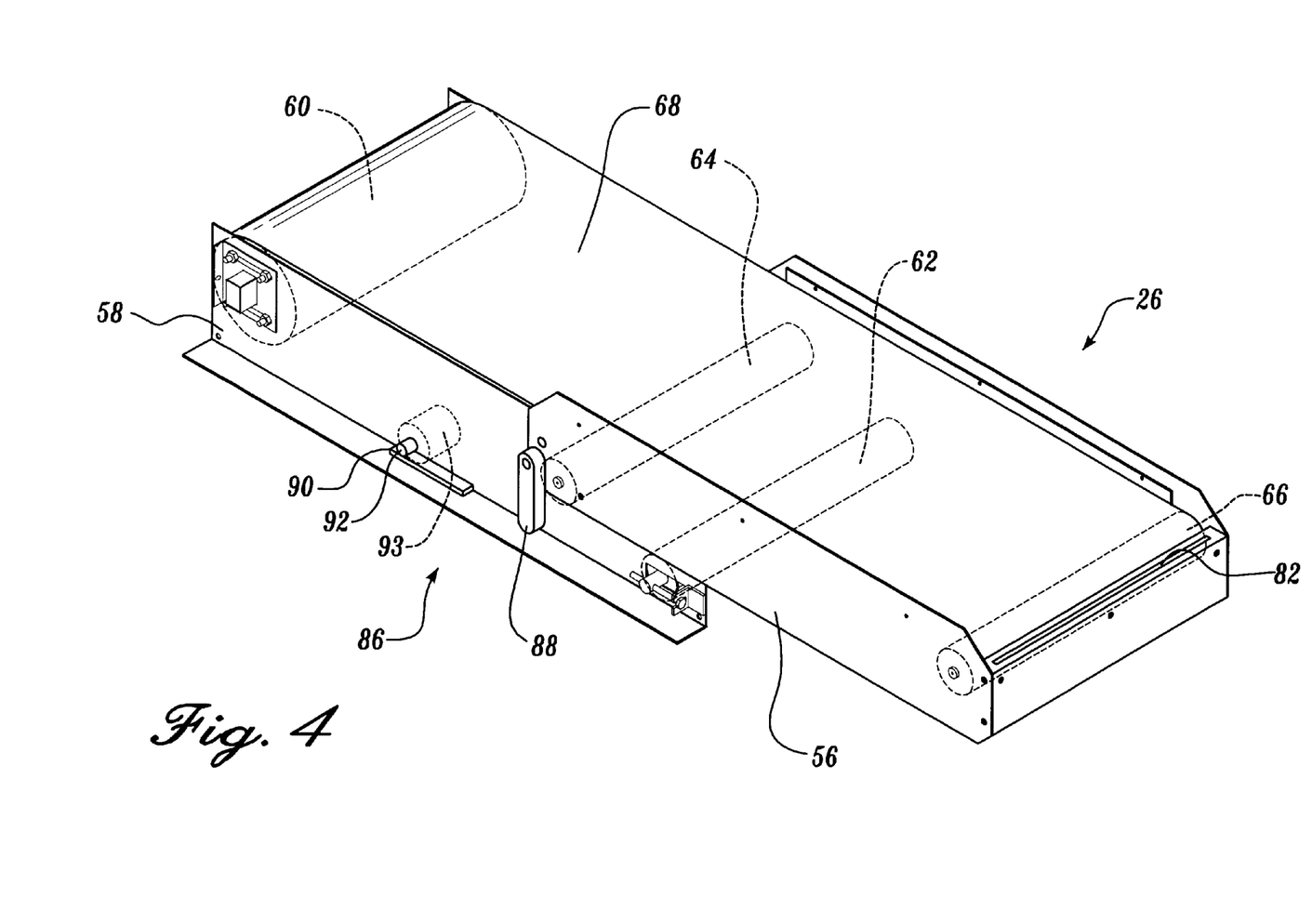
FIG. 4 is a side perspective view of the telescoping take-away conveyor incorporated in the check out stand of FIGS. 1–3, with the telescoping take-away conveyor in the position shown in FIG. 1.
Figure 5:
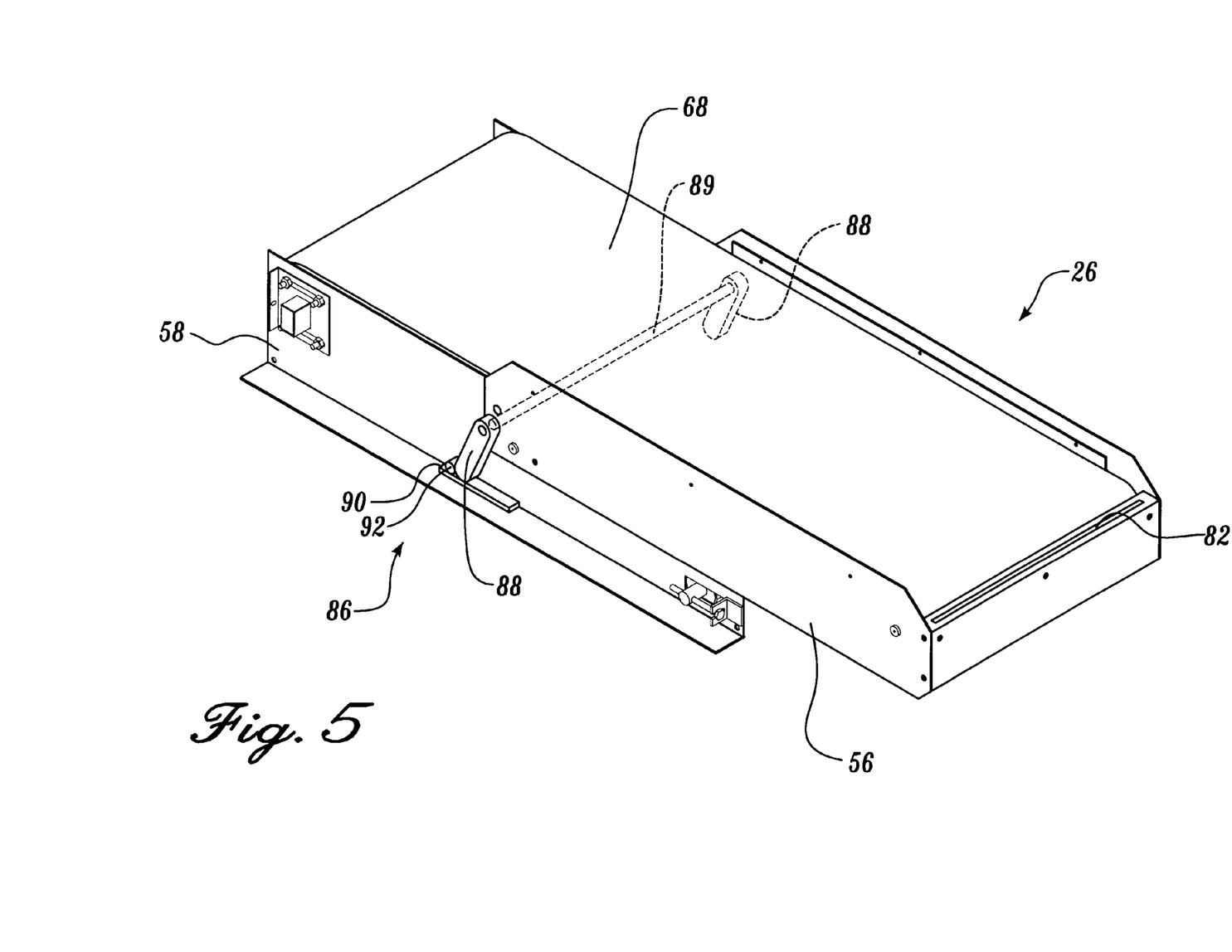
FIG. 5 is a side perspective view of the telescoping take-away conveyor incorporated in the check out stand of FIGS. 1–3, with the telescoping take-away conveyor in the position shown in FIG. 2A.
Figure 6:
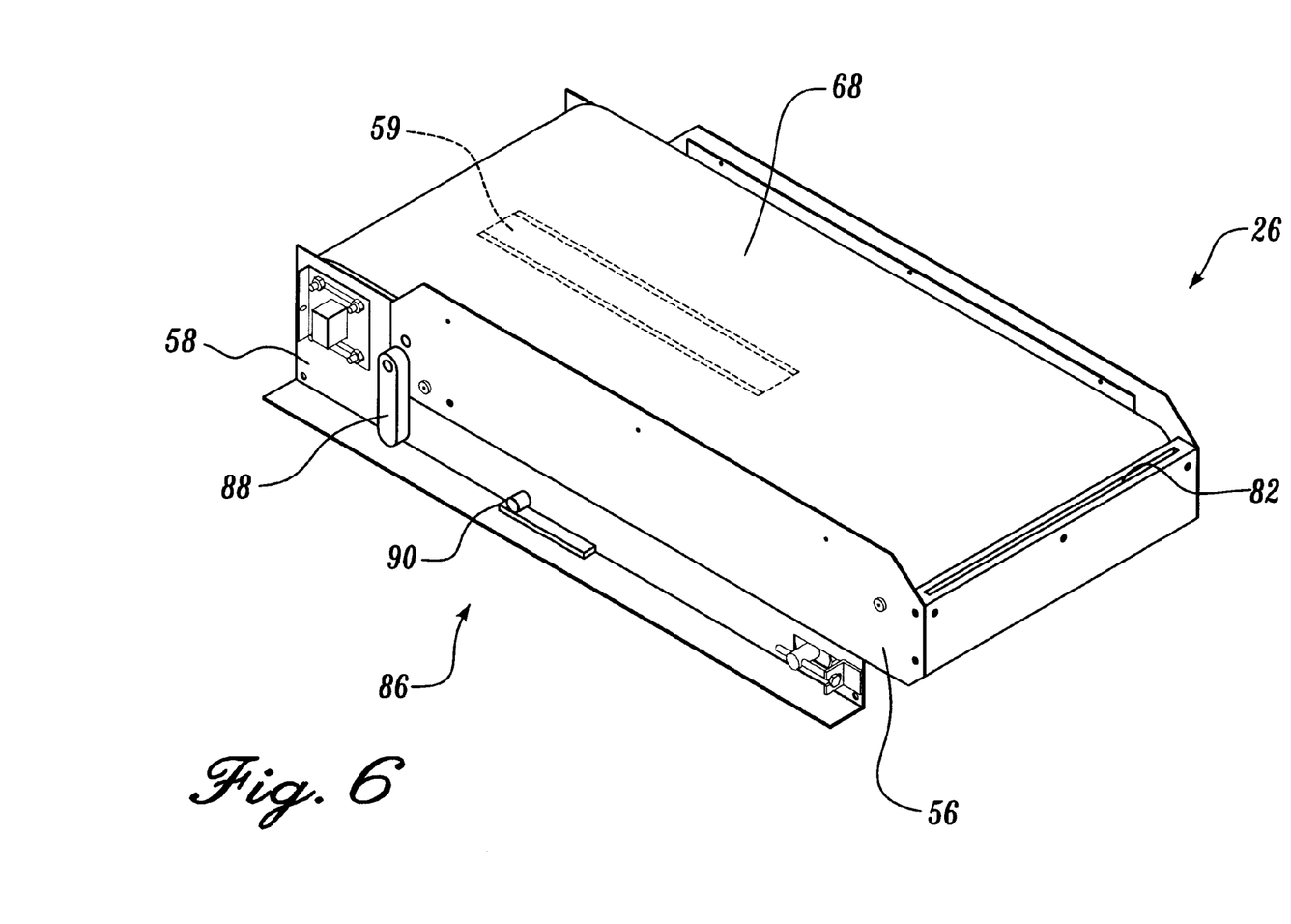
FIG. 6 is a side perspective view of the telescoping take-away conveyor incorporated in the check out stand of FIGS. 1–3, with the telescoping take-away conveyor in the position shown in FIG. 3.

As can best be seen in FIGS. 4, 5, and 6, the telescoping take-away conveyor 26 includes a slide tray 56 slidably mounted on a conveyor base 58. The conveyor base 58 and the slide tray 56 each have a rectangular box configuration, and the slide tray 56 is mounted along the top of the conveyor base for sliding movement therealong. The sliding arrangement of the slide tray 56 and the conveyor base 58 forms the "telescoping" function of the telescoping take-away conveyor 26. That is, the conveyor maintains a conveying surface in the same location at all times (within the rear module 24), but that conveying surface may be selectively lengthened, or expanded, to extend beyond that same location. This expansion, or lengthening, of the conveyor is different than movement of the entire conveyor in and out of a recess such as is described in the background section of this disclosure. The conveyor surface of the telescoping take-away conveyor 26 always extends to the back of the rear module, whereas the back of prior art retractable conveyors is pulled away from the back end of the rear module.

The conveyor base 58 and the slide tray 56 are mounted within an elongate recess in the rear module 24. The conveyor base 58 is mounted so that the conveying surface of the telescoping take-away conveyor 26 extends flush with the top surface 50 of the rear module, and is aligned so that the slide tray 56 extends outward toward the transition plate 33. The slide tray 56 extends parallel to the conveyor base 58, and is mounted so that as sliding occurs, the parallel relationship is maintained.

The slide tray 56 is preferably attached to the conveyor base 58 by drawer slides 59 (FIG. 6). The drawer slides 59 permit the slide tray 56 to smoothly glide along the conveyor base 58 from the position in FIG. 6 to the position in FIG. 4, and prevent lateral movement of the slide tray relative to the conveyor base. The drawer slides 59 also serve as a mechanical stop that limits the extension of the slide tray 56 relative to the conveyor base 58 so that the telescoping take-away conveyor 26 may only slide outward to the position shown in FIG. 1.

The telescoping take-away conveyor 26 includes a powered roller 60 that extends transversely to and perpendicularly across the trailing end of the conveyor base 58. The powered roller 60 includes a conventional motor (not shown, but know in the art) powered by an AC power supply. A front idler roller 62 extends parallel to the powered roller 60 at the lower portion of the opposite end of the conveyor base 58. A rear idler roller 64 also extends parallel to the powered roller 60 and is mounted for rotation at the lower, trailing end of the slide tray 56. The diameter of the front and rear idler rollers 62, 64 is preferably the same, but the diameter of the powered roller 60 is preferably approximately three times the diameter of the front and rear idler rollers.

Figure 2A:
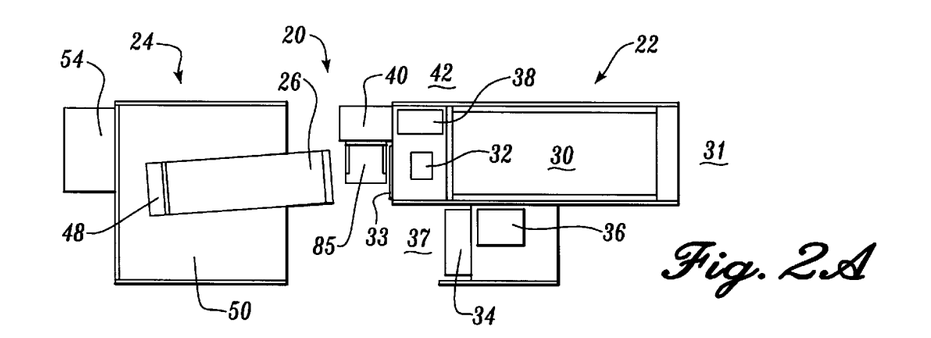
FIG. 2A is a top view of the check out stand of FIG. 1, with the telescoping take-away conveyor shown in a scan-and-bag position.
Figure 2B:
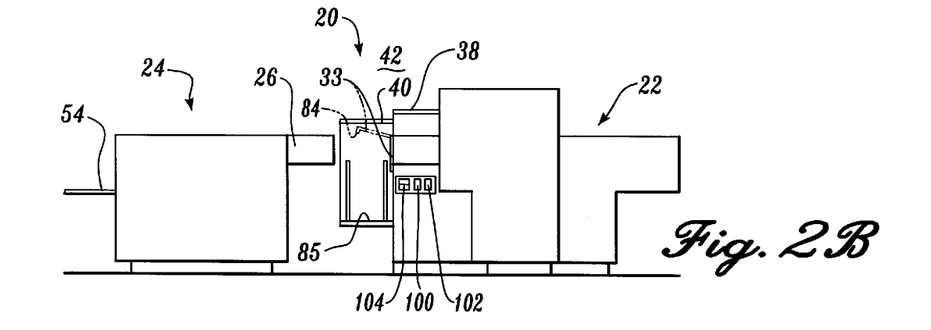
FIG. 2B is a left, register clerk side view of the check out stand of FIG. 2.
Figure 3:
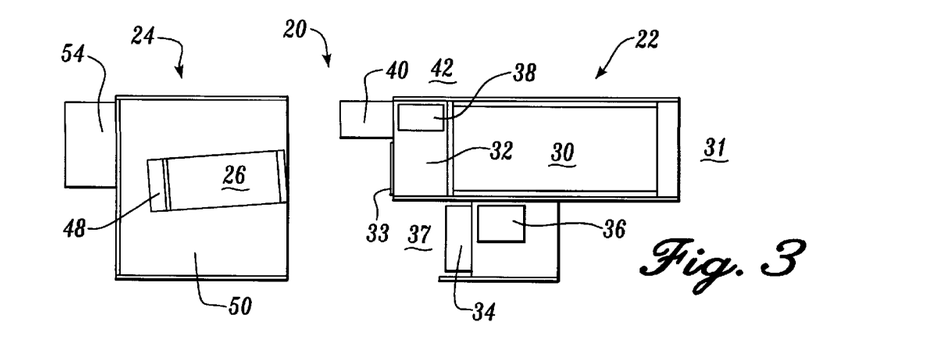
FIG. 3 is a top view of the check out stand of FIG. 1, with the telescoping take-away conveyor shown in a walk-through position.

A friction roller 66 extends perpendicularly across the leading, top edge of the slide tray 56. The friction roller 66 is preferably approximately the same diameter as the front and rear idler rollers 62, 64. A continuous belt 68 is mounted in tension around the rollers 60, 62, 64, 66. The continuous belt 68 winds around and over the powered roller 60 and friction roller 66, and follows a serpentine path around the friction roller 66, extending backward and around the rear idler roller 64, forward and then around the front idler roller 62, and back to the powered roller 60. The continuous belt 68 thus forms a double-S curve about the trailing surface of the two back rollers 60, 64 and the leading surface of the two front rollers 62, 66. The portion of the continuous belt 68 that extends between the top of the powered roller 60 and the top of the friction roller 66 is exposed along the top of the rear module 24 and forms the conveying surface for the telescoping take-away conveyor 26, as shown in FIGS. 1–3. The friction roller 66 is preferably tapered (not shown, but well known in the art) to aid in tracking of the continuous belt 68.

Figure 7:
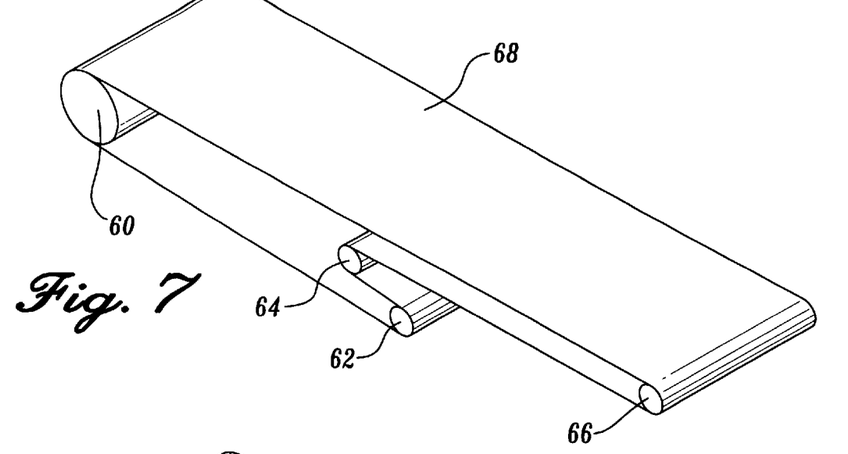
FIG. 7 is a side perspective view of the continuous belt and rollers of the telescoping take-away conveyor shown in FIG. 4.
Figure 8:
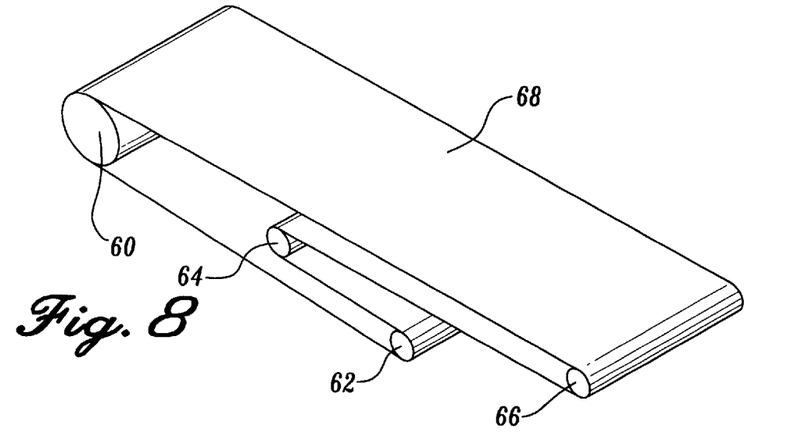
FIG. 8 is a side perspective view of the continuous belt and rollers of the telescoping take-away conveyor shown in FIG. 5.
Figure 9:
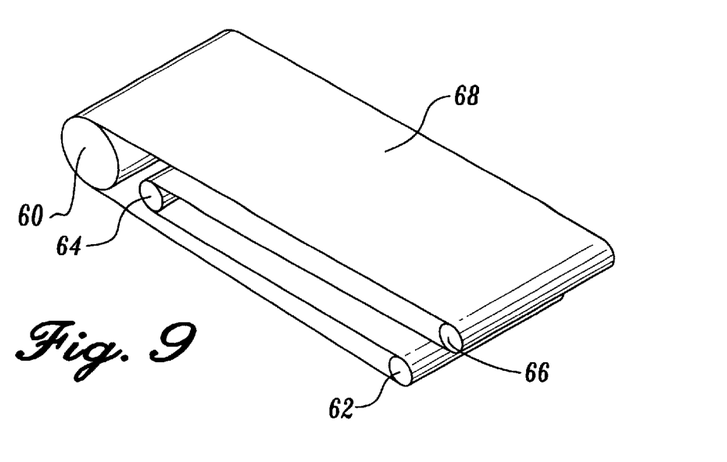
FIG. 9 is a side perspective view of the continuous belt and rollers of the telescoping take-away conveyor shown in FIG. 6.

The friction roller 66 is preferably mounted so that the top of the friction roller is even with the top of the powered roller 60. The front idler roller 62 and rear idler roller 64 are preferably mounted so that the section of the continuous belt 68 that extends between the two rollers extends parallel to the section of the continuous belt that serves as the conveying surface. Likewise, the rear idler roller 64 is mounted relative to the friction roller 66 so that the section of the continuous belt 68 that extends between the two rollers extends parallel to the conveying surface. Because each of these rollers 60, 62, 64, 66 is mounted either on the slide tray 56 or the conveyor base 58, and the conveyor base and slide tray are mounted to maintain a parallel orientation, the parallel relationships of these sections of the continuous belt 68 are maintained as the slide tray 56 is moved outward relative to the conveyor base 58, as can best be seen in FIGS. 7–9.

If the slide tray 56 is extended forward from the position in FIG. 4 to the position in FIG. 4, the rear idler roller 64 and the friction roller 66 move forward along with the slide tray 56. The continuous belt 68 remains in tension around the four rollers 60, 62, 64, 66 as the slide tray 56 moves outward. During this movement, the distance between the top of the friction roller 66 and the top of the powered roller 60 increases, thereby increasing the conveying surface of the telescoping take-away conveyor 26. The portion of the continuous belt 68 extending between the top of the front idler roller 62 and the bottom of the rear idler roller 64 is shortened by a distance which is equal to the increase in distance between the top of the friction roller 66 and the top of the powered roller 60.

Figure 10:
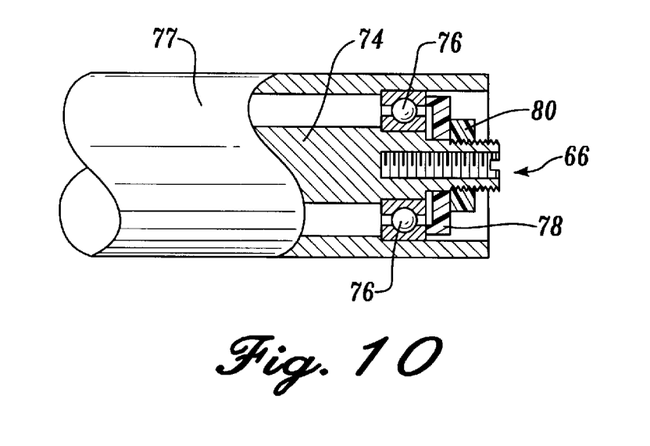
FIG. 10 is a sectional view of one end of the friction roller of the telescoping take-away conveyor shown in FIGS. 4–6.

The friction roller 66 is designed so that its rotation is resisted by friction. One manner of providing this friction is shown in FIG. 10. The friction roller 66 includes an axle 74 that is fixed to the slide tray 56. Bearings 76 extend between the axle 74 and an outer roller surface 77. The bearings 76 provide relatively frictionless rotation of the outer roller surface 77 relative to the axle 74. However, a nylon bushing 78 is provided that is tightened against the bearings 76 by a locking nut 80. The nylon bushing 78 presses against the bearings and impedes the bearings' rotation. Therefore, the nylon bushing 78 resists rotation of the outer roller surface 77 relative to the axle 74, and creates friction in its movement.

The friction in the friction roller 66 is adequate to provide extension and retraction of the telescoping take-away conveyor 26. As long as an outside force does not act on the slide tray 56, clockwise rotation of the powered roller 60 (FIG. 4) causes the slide tray to extend outward. The clockwise rotation of the powered roller 60 places tension on the portion of the belt extending between the bottom of the friction roller 66, around the front and rear idler rollers 64, 66, to the bottom of the powered roller 60. This tension presses the rear idler roller 64 forward relative to the front idler roller 62. Movement of the rear idler roller 64 forward causes a corresponding movement of the slide tray 56 forward, which extends the telescoping take-away conveyor 26. Thus, the force needed to overcome the friction caused by the nylon bushing 78 is greater than the force needed to extend the slide tray 56 relative to the conveyor base 58. Extension of the slide tray 56 continues until either the clockwise rotational movement of the power conveyor 60 is stopped, or the slide tray 56 encounters an outside force that is sufficient to overcome the energy required to rotate the friction roller 66. An example of an outside force that the slide tray 56 may encounter is the ends of the drawer slides 59 that prevent further outward extension of the slide tray. Once the ends are reached, the slide tray 56 and the rear idler roller 64 may no longer move outward, and the continuous belt 68 rotates about all the rollers 60, 62, 64, 66 against the friction caused by the nylon bushing 78.

Reversing the rotation of the powered roller 60 so that it rotates in the counterclockwise direction retracts the telescoping take-away conveyor 26. Counterclockwise rotation of the powered roller 60 causes tension in the section of the continuous belt 68 between the top of the power conveyor 60 and the top of the friction roller 66. The force needed to pull the slide tray 56 inward is less than the force needed to overcome the friction in the friction roller 66. Thus, as the power conveyor continues to pull on the continuous belt 68, the friction roller 66 is pulled toward the powered roller 60. Pulling the friction roller 66 in this direction moves the slide tray 56 toward the left in FIG. 4, causing retraction of the telescoping take-away conveyor 26.

It is to be understood that the positions of the powered roller 60, the idler rollers 62, 64, and the friction roller 66 may be changed. However, for the powered roller 60 and friction roller 66 to work in conjunction to extend and retract the telescoping take-away conveyor, the powered roller 60 and the friction roller 66 must be mounted so that one is on the slide tray 56, and the other is on the base 58.

To extend the telescoping take-away conveyor 26 outward from the configuration of FIG. 3 to the configuration of FIG. 1, power is supplied to the powered roller 60 so that it rotates in the clockwise direction. The slide tray 56 and the telescoping take-away conveyor 26 extend outward to the position of FIG. 1. Once the end of the drawer slides 59 are reached, rotation of the continuous belt 68 about the rollers 60, 62, 64, 66 begins. At that time, the continuous belt 68 is traveling in the "reverse," direction, such that the continuous belt conveys items towards, instead of away from, the scanner 32. However, simply reversing the rotation of the powered roller 60 will cause the telescoping take-away conveyor 26 to retract. To prevent the telescoping take-away conveyor 26 from retracting once the telescoping take-away conveyor is extended and the direction of the powered roller 60 is reversed to the counterclockwise direction, a recess 82 (FIG. 4) is provided along the front edge of the slide tray 56. A rounded edge 84 of the transition plate 33 extends into the recess 82 when the telescoping take-away conveyor 26 is in the extended position. The transition plate 33 is lifted and held upward by the register clerk from the downwardly extended position while the telescoping take-away conveyor 26 extends. When the telescoping take-away conveyor 26 reaches the end of its extension, the transition plate 33 is lowered by the register clerk until the rounded edge 84 extends into the recess 82 on the slide tray 56. The direction of the powered roller 60 is then reversed to the counterclockwise direction, or "normal" rotation of the continuous belt 68. The connection between the rounded edge 84 on the transition plate 33 and the front recess 82 of the slide tray 56 prevents the telescoping take-away conveyor 26 from retracting. The continuous belt 68 then rotates around the rollers 60, 62, 64, 66 against the friction in the friction roller. The register clerk may then retrieve items off the accumulation conveyor 30, scan the items on the scanner 32, and place them on the telescoping take-away conveyor 26.

Frequently, it is desirable for the telescoping take-away conveyor 26 to extend only part of the way between the fully extended position of FIG. 3 and the retracted position of FIG. 1. One such intermediate position is the "scan-and-bag" check out stand configuration described above and shown in FIGS. 2A and 2B. In the scan-and-bag configuration, a single bag 85 (FIG. 2A) is inserted adjacent to the plate 33 in the area exposed when the telescoping take-away conveyor is retracted. The telescoping take-away conveyor 26 extends to the opposite side of the single bag 85. By placing the telescoping take-away conveyor 26 and the single bag 85 in this position, the register clerk may scan items and either bag the items at the single bag 85 or place the scanned groceries on the telescoping take-away conveyor 26 to be forwarded to the rear module 21.

The telescoping take-away conveyor 26 will not stop during expansion or retraction at the position shown in FIG. 2 unless the telescoping take-away conveyor 26 is acted upon by an outside force. A mechanical stop 86 (FIGS. 4–6) is provided that prevents retraction of the telescoping take-away conveyor 26 at the scan-and-bag position shown in FIG. 2. The mechanical stop 86 includes a pair of eccentric cams 88 mounted on opposite ends of an axle 89 FIG. 5). The axle 89 extends parallel to the friction roller 66 and through rear portion of the slide tray 56. The axle 89 extends through holes on opposite sides of the slide tray 56 and is mounted for axial rotation therein. The eccentric cams 88 are rotatably mounted to opposite ends of the axle 89. The eccentric cams 88 are sufficiently weighted at their ends such that they will extend downward by gravity. Elongate guides 90 extend along the length of both sides of the conveyor base 58. Stop brackets 92 are provided on opposite sides of the conveyor base 58 along the top rear edge of the elongate guides. Although only one set of the eccentric cams 88, elongate guides 90, and stop brackets 92 are shown in the drawings, it is to be understood that the opposite side of the telescoping take-away conveyor includes the same elements and is the mirror image of the side shown. The stop brackets 92 are spaced the same distance from the back of the conveyor base 58. The stop brackets 92 extend from a solenoid 93 which rotates to raise or lower the stop brackets.

As the telescoping take-away conveyor 26 expands to the extended position of FIG. 3, the bottom portions of the eccentric cams 88 engage the stop brackets 92 at the rear edge of the guides 90, causing the cams 88 to rotate. The eccentric cams 88 continue to rotate and roll over the stop brackets 92. As the telescoping take-away conveyor 26 continues to extend, the eccentric cams 88 slide along the top of the guides 90 (FIG. 5). The distance between the top of the guides 90 and the rotational axis of the eccentric cams 88 is such that the cams are at approximately a 45° angle from the vertical when they are sliding along the guides 90 (FIG. 5). The guides 90 are of sufficient length so that the eccentric cams 88 maintain this position and contact with the guides for approximately three inches of extension past the stop brackets 92. If the extension of the telescoping take-away conveyor 26 continues beyond this point, the bottom portions of the eccentric cams 88 release from the guides 90 and the eccentric cams 88 rotate freely to allow gravity to move the cams to the vertical position (FIG. 4).

Figure 11:
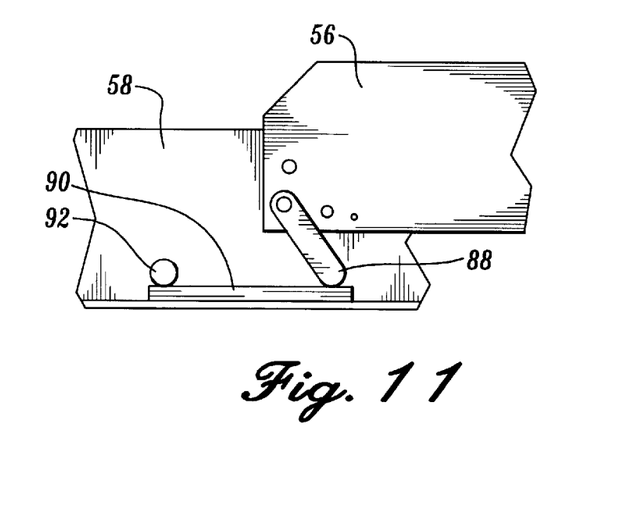
FIG. 11 is a side view of a portion of the telescoping take-away conveyor of FIG. 1, with the telescoping take-away conveyor in a position intermediate the position shown in FIGS. 2A and 3.

If the telescoping take-away conveyor 26 is retracted from the position shown in FIG. 1 to the position shown in FIG. 3, the bottom portions of the eccentric cams 88 engage the front edge of the guides 90, causing the eccentric cams to rotate. As the telescoping take-away conveyor continues to retract, the eccentric cams 88 extend at approximately a 45° angle from the vertical and slide along the tops of the guides 90 (FIG. 11). Continued retraction of the telescoping take-away conveyor 26 causes the eccentric cams 88 to engage and roll over the stop brackets 92. The eccentric cams 88 are then free to rotate by gravity to the vertical position shown in FIG. 6.

If the telescoping take-away conveyor is extending and the direction of the telescoping take-away conveyor 26 is reversed while the eccentric cams 88 are in contact with the guides 90, the eccentric cams 88 maintain their 45° relationship to the guides 90 but slide in the opposite direction. When the eccentric cams 88 reach the stop brackets 92 (FIG. 5), the retraction of the telescoping take-away conveyor 26 is stopped. The engagement of the eccentric cams 88 with the stop brackets 92 restricts further retraction of the telescoping take-away conveyor 26 and the belt begins rotation about the rollers 60, 62, 64, 66 against the friction in the friction roller 66. To continue retraction of the telescoping take-away conveyor 26 from this position, the solenoid 93 is energized and the stop brackets 92 are withdrawn. The eccentric cams 88 are once again free to slide along the guides 90 and the slide tray 56 retracts to the position shown in FIG. 6. The telescoping take-away conveyor 26 is then fully retracted into the rear module 24.

The operation of the powered roller 60 is controlled by two buttons 100, 102, and a switch 104 (FIG. 2B). The two buttons 100, 102 and the switch 104 are located on the register clerk side of the front module 22 adjacent to the register 36. The switch 104 is a three-way switch. Its location determines on or off in normal belt direction of the powered roller 60. The first button 100 is the momentary on button for the reverse direction of the powered roller 60. As is described in detail above, reversing the direction of the powered roller 60 causes the telescoping take-away conveyor 26 to extend. The second button 102 is a momentary switch, used to operate the solenoid 93 for the stop brackets 92 on the mechanical stop 86. Pressing the second button 102 will momentarily energize the solenoid 93 to lower the stop brackets 92 and allow the telescoping take-away conveyor to retract from the scan-and-bag position of FIG. 2 to the walk-through position of FIG. 3.

The operation of the check out stand 20 can be understood with reference to the above description. A register clerk arrives at the register clerk station 37. If the register clerk determines that he or she would like to perform the scan-and-pass operation described above (FIG. 1), then the register clerk presses and holds the button 100 to extend the telescoping take-away conveyor 26 outward toward the scanner 32. During this movement, the eccentric cams 88 roll over the stop brackets 92 and slide along and over the guides. As the telescoping take-away conveyor is extending, the register clerk lifts the transition plate 33. The telescoping take-away conveyor 26 reaches the end of its slide, and the drawer slides 59 preclude further extension. The continuous belt 68 then rotates about the rollers 60, 62, 64, 66. The register clerk lowers the transition plate 33 such that the rounded edge 84 of the transition plate 33 extends to the recess 82 of the slide tray 56. The register clerk then releases the button 100 so as to stop reverse rotation of the continuous belt 68. The switch 104 may then be turned "on" for operation of the continuous belt 68 in the normal direction. The movement of the continuous belt 68 may be stopped at any time by switching the switch 104 back to the "off" position.

To move the telescoping take-away conveyor 26 from the scan-and-pass position of FIG. 1 to the walk-through position of FIG. 3 when the continuous belt 68 is in normal operation requires only that the transition plate 33 be lifted. By lifting the transition plate 33, the front end of the slide tray 56 is released and retraction of the telescoping take-away conveyor 26 begins. The eccentric cams 88 roll over the stop brackets 92 and the guides 90, and retraction of the telescoping take-away conveyor 26 continues until the slide tray 56 reaches the beginning of its slide and is fully received within the rear module 24. The continuous belt then rolls about the rollers 60, 62, 64, 66 in the normal direction. Operation of the continuous belt may be stopped by switching the switch 104 to the "off" position.

To move the telescoping take-away conveyor 26 from the walk-through position of FIG. 3 to the scan-and-bag position of FIG. 2, the first button 100 is depressed and held to extend the telescoping take-away conveyor 26 until the eccentric cams 88 have rolled over the stop brackets 92. The first button 100 is released while the eccentric cams 88 remain on the guides 90. One manner of knowing this position is by inserting the single bag module 85 in the position shown in FIG. 2B. When the front end of the telescoping take-away conveyor comes into contact with the single bag module 85, the eccentric cams 89 are in contact with the guides 90. Releasing the first button 100 stops extension of the telescoping take-away conveyor 26. The switch 104 is then switched to the "on" position so that the telescoping take-away conveyor 26 begins to retract. During this movement, the eccentric cams 88 slide along the guides 90 until the eccentric cams engage the stop brackets 92. The engagement of the eccentric cams 88 with the stop brackets 92 restricts further retraction of the telescoping take-away conveyor, and the continuous belt 56 begins rotation in the normal direction.

To retract the telescoping take-away conveyor 26 from the scan-and-bag position of FIG. 2 to the walk-through position of FIG. 3, the second button 102 is depressed while the continuous belt is rotating in the normal direction. Depressing the second button 102 momentarily lowers the stop brackets 92, which allows the eccentric cams 88 to release and the telescoping take-away conveyor 26 to retract.

It can be understood that any number of different movements of the telescoping take-away conveyor 26 by using the buttons 100, 102 and the switch 104. Another switch (not shown, but known in the art) may be provided at the bagging station 54 for stopping and starting the telescoping take-away conveyor 26.

It can be understood that the present invention provides many benefits over prior art check out stands. The check out stand 20 provides automatic retraction and extension of the telescoping take-away conveyor 26 to the scan-and-pass, scan-and-bag, or walk-through positions. A register clerk does not have to manually lift or slide the telescoping take-away conveyor 26, nor leave his or her post to reconfigure the check out stand 20. In addition, the telescoping take-away conveyor 26 expands, or lengthens, to extend to the front module 22 yet maintains a back end of the conveying surface at the back of the rear module 24.

While the preferred embodiment of the invention has been illustrated and described, it will be apparent that various changes can be made therein without departing from the spirit and scope of the invention as defined in the appended claims.

The embodiments of the invention in which an exclusive property or privilege is claimed are defined as follows:

1. A check out stand comprising:
    a front module;
    a rear module; and
    a telescoping take-away conveyor defining a conveying surface and attached to one of the front module and the rear module, the telescoping take-away conveyor being capable of expanding and lengthening to extend toward and away from the other of the front module and the rear module, whereby the telescoping conveyor is reconfigurable from a first position in which the conveying surface is exposed and the telescoping take-away conveyor does not extend to the other of the first module and the rear module, a second position in which the conveying surface is exposed and the telescoping take-away conveyor extends to adjacent to the other of the front module and the rear module, and a third position intermediate the first and second positions in which the conveying surface is exposed.

2. The check out stand of claim 1, further comprising a scanner located at the end of front module closest to the rear module.

3. The check out stand of claim 1, wherein the telescoping take-away conveyor comprises:
    a conveyor base mounted to the one of the front module and the rear module;
    a slide tray slidably mounted along the conveyor base, a first force being required to slide the slide tray along the conveyor base;
    a powered roller mounted transverse to one of the conveyor base and the slide tray;

first and second idler rollers, the first idler roller mounted parallel to the powered roller and on the one of the conveyor base and the slide tray, the second idler roller mounted parallel to the powered roller and on the other of the conveyor base and slide tray;

a friction roller mounted parallel to the powered roller and on the other of the conveyor base and the slide tray, a second force being required to rotate the friction roller; and a continuous belt wrapped in tension around the powered roller, the first and second idler rollers, and the friction roller in such a manner that the continuous belt maintains its tension about the powered roller, the first and second idler rollers, and the friction roller as the slide tray slides relative to the conveyor base;

the force differential between the first and second forces being such that rotation of the powered roller causes rotation of the continuous belt about the powered roller which, unless an outside force acts on the slide tray, causes retraction and extension of the slide tray relative to the conveyor base, thereby extending the telescoping take-away conveyor toward and away from the other of the front module and the rear module.

4. The check out stand of claim 3, wherein the friction roller comprises:

an axle;

a bearing around the axle;

a roller surface around the bearing; and a repositionable bushing capable of applying pressure to the bearing, the pressure impeding rotation of the roller surface about the axle.

5. The check out stand of claim 3, further comprising a mechanical stop that limits extension of the slide tray relative to the conveyor base.

6. The check out stand of claim 5, wherein the mechanical stop precludes extension of the slide tray once the telescoping conveyor has reached the front module.

7. The check out stand of claim 3, further comprising a linkage that is selectively attachable between the other of the front module and the rear module and the telescoping conveyor.

8. The check out stand of claim 7, further comprising a scanner located at the end of front module closest to the rear module, and wherein the one of the front module and the rear module is the rear module and the linkage comprises a transition plate hinged from the end of the scanner located closest to the telescoping conveyor.

9. The check out stand of claim 8, wherein the end of the telescoping conveyor closest to the front module comprises a slot, and the transition plate comprises a flange for extending into the slot.

10. The check out stand of claim 3, further comprising a mechanical stop that permits extension of the of the telescoping conveyor from the first position to second position and selectively stops retraction of the telescoping conveyor between the first and second positions at a third position.

11. The check out stand of claim 10, wherein the mechanical stop comprises a solenoid mounted on a first of the conveyor base and the slide tray, the solenoid comprising a stop bracket that is selectively operable between an in position in which the retraction of the telescoping conveyor between the first and second positions is not stopped, and an out position in which retraction of the telescoping conveyor between the first and second positions is stopped at the third position.

12. The check out stand of claim 11, wherein the mechanical stop further comprises a rotatable cam mounted on the second of the conveyor base and the slide tray, the rotatable cam configured to roll over the stop bracket when the stop bracket is in the out position and the telescoping take-away conveyor is extending, and engage the stop bracket when the stop bracket is in the out position and the telescoping take-away conveyor is retracting, the engagement of the rotating cam with the stop bracket causing the telescoping take-away conveyor to stop at the third position.

13. The check out stand of claim 1, further comprising a mechanism that automatically extends the telescoping conveyor from the first position to the second position.

14. The check out stand of claim 1, wherein the telescoping conveyor comprises:

a conveyor base mounted to the rear module;

a slide tray slidably mounted along the conveyor base, a first force being required to slide the slide tray along the conveyor base;

a powered roller mounted transverse to one of the conveyor base and the slide tray;

a friction roller mounted parallel to the powered roller and on the other of the conveyor base and the slide tray, a second force being required to rotate the friction roller; and a continuous belt wrapped in tension around the powered roller and the friction roller in such a manner that the continuous belt maintains its tension about the powered roller and the friction roller as the slide tray slides relative to the conveyor base;

the force differential between the first and second forces being such that rotation of the powered roller causes rotation of the continuous belt about the powered roller which, unless an outside force acts on the slide tray, causes retraction and extension of the slide tray relative to the conveyor base, thereby extending the telescoping take-away conveyor toward and away from the other of the front module and the rear module.

15. A check out stand comprising:

a front module;

a rear module;

a take-away conveyor received within one of the rear module and the front module and extendible toward and away from the other of the rear module and the front module, from a first position in which the take-away conveyor does not extend to the other of the front module and the rear module and a second position in which the take-away conveyor extends to adjacent to the other of the front module and the rear module; and a mechanism that automatically extends the conveyor from the first position to the second position.

* * * * *